United States Patent
Liu et al.

(10) Patent No.: US 7,078,149 B2
(45) Date of Patent: Jul. 18, 2006

(54) OPTICAL RECORDING MEDIUM AND METHOD FOR MAKING THE SAME

(75) Inventors: Wen-Dar Liu, Ilan (TW); Nae-Jen Wang, Kaohsiung (TW); Wan-Chun Chen, Keelung (TW); Biing-Hwang Lin, Miaoli (TW); Hui-Jen Chen, Yungkang (TW); Hsin-Te Kuo, Taipei (TW)

(73) Assignee: Ritek Corporation, Hsinchu (TW)

( * ) Notice: Subject to any disclaimer, the term of this patent is extended or adjusted under 35 U.S.C. 154(b) by 277 days.

(21) Appl. No.: 10/264,472

(22) Filed: Oct. 3, 2002

(65) Prior Publication Data

US 2003/0235783 A1    Dec. 25, 2003

(30) Foreign Application Priority Data

Jun. 12, 2002   (TW) .................. 91112983 A

(51) Int. Cl.
*G11B 7/24* (2006.01)

(52) U.S. Cl. .............. 430/270.19; 430/270.2; 430/270.21; 430/270.18; 428/64.8; 369/288

(58) Field of Classification Search ........... 430/270.14, 430/270.16, 270.18, 270.2, 270.21, 270.19
See application file for complete search history.

(56) References Cited

U.S. PATENT DOCUMENTS 5,298,608 A * 3/1994 Murayama et al. ......... 534/693

(Continued)

FOREIGN PATENT DOCUMENTS

JP        59-171688    *    9/1984
JP        05-050771    *    3/1993

(Continued)

OTHER PUBLICATIONS

English translation of Kadota.*

(Continued)

*Primary Examiner*—Martin Angebranndt
(74) *Attorney, Agent, or Firm*—J.C. Patents

(57) ABSTRACT

A method for fabricating an optical recording medium is provided. A dye layer is formed on a molded substrate by spin-coating. A reflection layer is formed on the dye layer by sputtering so that the optical disc has enough reflection rate. The dye layer comprises a cyanine type dye and an azo metal chelate compound selected from the formula (I):

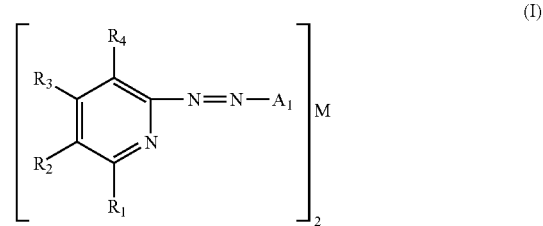

wherein M is a metal ion; $R_1$ is a hydrogen atom, a linear or branched alkyl group containing 1 to 6 carbon atoms, amino group, alkyl amino group or toluidinyl group; $R_2$ is a hydrogen atom, a hydroxyl group, a halogen atom, an ether group, an ester group or a linear or branched alkyl group containing 1 to 6 carbon atoms; R3 is a hydrogen atom or a linear or branched alkyl group containing 1 to 6 carbon atoms; R4 is a hydrogen atom, a halogen atom or a linear or branched alkyl group containing 1 to 6 carbon atoms; A1 is a heterocyclic derivative group constituted by carbon atoms and nitrogen atoms.

21 Claims, 1 Drawing Sheet

U.S. PATENT DOCUMENTS

| | | | |
|---|---|---|---|
| 5,330,542 A | * | 7/1994 | Maeda et al. .................. 8/639 |
| 6,683,188 B1 | * | 1/2004 | Kasada et al. ............. 548/181 |
| 6,689,872 B1 | * | 2/2004 | Wang et al. ................ 534/703 |
| 6,794,114 B1 | * | 9/2004 | Shoda et al. ........... 430/270.16 |

FOREIGN PATENT DOCUMENTS

| | | | | |
|---|---|---|---|---|
| JP | | 05-185751 | * | 7/1993 |
| JP | | 07-172059 | * | 7/1995 |
| JP | | 09-193545 | * | 7/1997 |
| JP | | 10-244755 | * | 9/1998 |
| JP | | 2000-062320 | * | 2/2000 |
| JP | | 2000-190641 | * | 7/2000 |
| JP | | 2001-158862 | * | 6/2001 |
| JP | | 2002-088260 | * | 3/2002 |
| JP | | 2002-274040 | * | 9/2002 |
| JP | | 2002-338549 | * | 11/2002 |

OTHER PUBLICATIONS

English Translation of Maeda '09.*
English translation of Azuma.*
English language abstract of Komamura.*
English translation of Maeda '10.*
English language abstract of Tanaka.*
English language abstract of Kawakami.*
English language abstract of Saito.*
English language abstract of Azuma.*
Shibata et al, "Synthese of azo dyes containing 4,5-diphenylimidazole and their evaluation as analytical reagents", Analytica Chimica Acta; vol. 81 pp. 131-141 (1976).*

* cited by examiner

OPTICAL RECORDING MEDIUM AND METHOD FOR MAKING THE SAME

CROSS-REFERENCE TO RELATED APPLICATION

This application claims the priority benefit of Taiwan application serial no. 91112983, filed Jun. 12, 2002.

BACKGROUND OF THE INVENTION

1. Field of Invention

The invention relates to an optical recording medium and a method for making the same. More particularly, the invention relates to a digital versatile disc-recordable (DVD-R) and a method for making the same.

2. Description of Related Art

As the digital era progresses, more and more multimedia and network products are becoming known, as the consumer's request to store computer data increases. Considering storage capacity, safety and convenience, the digital versatile disc-recordable (DVD-R) is the most useful tool for storing a large amount of data such as video data. The development of DVD-R is highly appreciated, since its manufacturing process is similar to that of the compact disc and lower cost.

The manufacturing process of DVD-R is based on the technique of the compact disc. A molded plastic substrate with a thickness of 0.6 mm having grooves thereon is first provided. On the basis of low cost, low moisture absorption, high transparency and high throughput, the PC (polycarbonate) substrate is preferred. Thereafter, a dye layer serving as a recording layer is coated on the substrate by spin-coating. The dye layer has a maximum absorption at the wavelength range from 500 nm to 650 nm. A metal layer serving as a reflection layer is formed on the dye layer. Another PC protective layer having a thickness of 0.6 mm is bounded to the reflection layer to form a disc having a thickness of 1.2 mm. However, in the process of manufacturing the CD-R, after a reflection layer is formed on a substrate with a thickness of 1.2 mm by sputtering, an ultraviolet setting resin is spin-coated on the reflection layer. The difference between CD-R and DVD-R is that DVD-R is formed by two PC plates, each having a thickness of 0.6 mm; while CD-R is formed by only one PC plate having a thickness of 1.2 mm.

In the spin-coating process of CD-R or DVD-R, dye is uniformly coated on the substrate. The amount of the dye in the grooves and on the lands between grooves is adjusted by the parameter of the spin-coating process so that the light path difference (Ld) between the grooves and the lands can be controlled. The light path difference between the groove and the land affects the tracking signal and compatibility and then the recording quality of the disk is affected.

In theory, the depth and the width of the grooves can be designed and the solvent or the dye can be selected to control the light path difference. However, this still has limitations. First, the depth of the grooves cannot be increased or decreased arbitrarily. If the depth of the grooves increases, the aspect ratio increases so that the size of the grooves cannot be precisely controlled during the molding process of the substrate. If the depth of the grooves decreases, recorded signal modulation of the disk products are too low, so as to decrease the recording quality. On the other hand, the substrate is usually a PC plate, but the solvent resistance of PC material is poor. Therefore, the dyes usually dissolve in alcohol such as tetrafluoropropanol. However, the solubility of azo metal chelate compounds in alcohol is low. Specifically, when the solubility is below 2%, the gap filling property of the dyes in the grooves is poor, so that a tracking signal such as the push-pull tracking signal amplitude before cannot conform to the standard and so the compatibility of the discs is affected. Therefore, if the solubility of the dyes is too low, it cannot be used in the industry.

Japanese Unexamined Patent Publications No. 112790/1983, No. 114989/1983, No. 85791/1984 and No. 83236/1985 provide an optical recording medium using cyanine type dyes as the dye layer. The cyanine type dyes have high solubility, so that alcohol can be used as a solvent to dissolve it and the cyanine type dyes have a good ability to fill the grooves.

However, the cyanine type dye has poor light resistance. When the cyanine type dye is applied to the optical recording medium, quencher is required to be added for providing a sufficient durability against the optical degradation, for example, U.S. Pat. No. 5,328,741, U.S. Pat. No. 5,328,802 and U.S. Pat. No. 5,336,584. The quencher can improve the light resistance, but reducing solubility during the process for fabricating the disc is a drawback of the quencher. If the quencher is not appropriately used, crystal is precipitated so as to damage the recording function. On the other hand, the cost of the disc increases since the quencher is more expensive than the cyanine type dye.

SUMMARY OF THE INVENTION

The present invention provides an optical recording medium to improve the tracking signal, the storage stability and the durability against an optical degradation.

The present invention also provides a method for fabricating an optical recording medium to improve solubility of the dye serving as a dye layer.

The present invention provides an optical recording medium. The optical recording medium comprises a dye layer on a substrate and a reflection layer on the dye layer, wherein the dye layer comprises a cyanine type dye and an azo metal chelate compound selected from the formula (I):

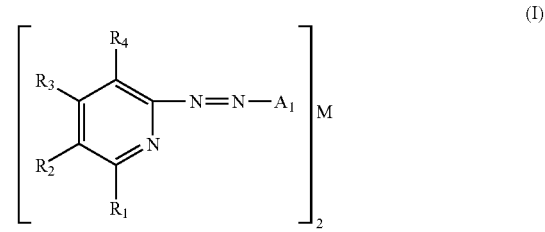

wherein M is a metal ion; $R_1$ is a hydrogen atom, a linear or branched alkyl group containing 1 to 6 carbon atoms, amino group, alkyl amino group or toluidinyl group; $R_2$ is a hydrogen atom, a hydroxyl group, a halogen atom, an ether group, an ester group or a linear or branched alkyl group containing 1 to 6 carbon atoms; $R_3$ is a hydrogen atom or a linear or branched alkyl group containing 1 to 6 carbon atoms; $R_4$ is a hydrogen atom, a halogen atom or a linear or branched alkyl group containing 1 to 6 carbon atoms; A1 is a heterocyclic derivative group constituted by carbon atoms and nitrogen atoms.

The present invention provides a method for fabricating an optical recording medium. A molded substrate is provided. A dye layer is formed on the molded substrate by spin-coating. A reflection layer is formed on the dye layer by sputtering so that the optical disc has enough reflection rate. The dye layer comprises a cyanine type dye and an azo metal chelate compound selected from the formula (I):

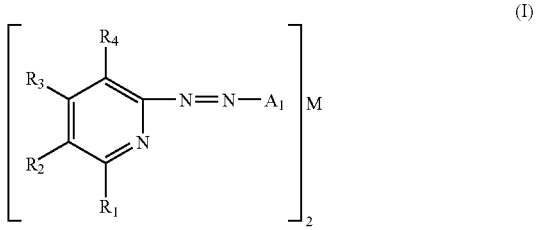

(I)

wherein M is a metal ion; $R_1$ is a hydrogen atom, a linear or branched alkyl group containing 1 to 6 carbon atoms, amino group, alkyl amino group or toluido group; $R_2$ is a hydrogen atom, a hydroxyl group, a halogen atom, an ether group, an ester group or a linear or branched alkyl group containing 1 to 6 carbon atoms; R3 is a hydrogen atom or a linear or branched alkyl group containing 1 to 6 carbon atoms; R4 is a hydrogen atom, a halogen atom or a linear or branched alkyl group containing 1 to 6 carbon atoms; A1 is a heterocyclic derivative group constituted by carbon atoms and nitrogen atoms.

The present invention also provides a method for improving tracking signal of an optical recording medium. A dye layer of the optical recording medium comprises at least one compound and at least one cyanine type dye, wherein the compound is dissolved in tetrafluoropropanol having a solubility no more than 2% and the compound is contained in an amount of no less than 51% by weight based on the total amount of the dry component of the dye layer, and the cyanine type dye is dissolved in tetrafluoropropanol having a solubility no less than 2%. The compound is an azo metal chelate compound selected from the formula (I):

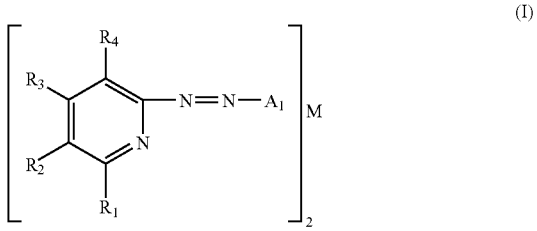

(I)

wherein M is a metal ion; $R_1$ is a hydrogen atom, a linear or branched alkyl group containing 1 to 6 carbon atoms, amino group, alkyl amino group or toluidinyl group; $R_2$ is a hydrogen atom, a hydroxyl group, a halogen atom, an ether group, an ester group or a linear or branched alkyl group containing 1 to 6 carbon atoms; $R_3$ is a hydrogen atom or a linear or branched alkyl group containing 1 to 6 carbon atoms; $R_4$ is a hydrogen atom, a halogen atom or a linear or branched alkyl group containing 1 to 6 carbon atoms; and A1 is a heterocyclic derivative group constituted by carbon atoms and nitrogen atoms.

According to the optical recording medium of the present invention, the tracking signal, the storage stability and the durability against an optical degradation can be improved.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
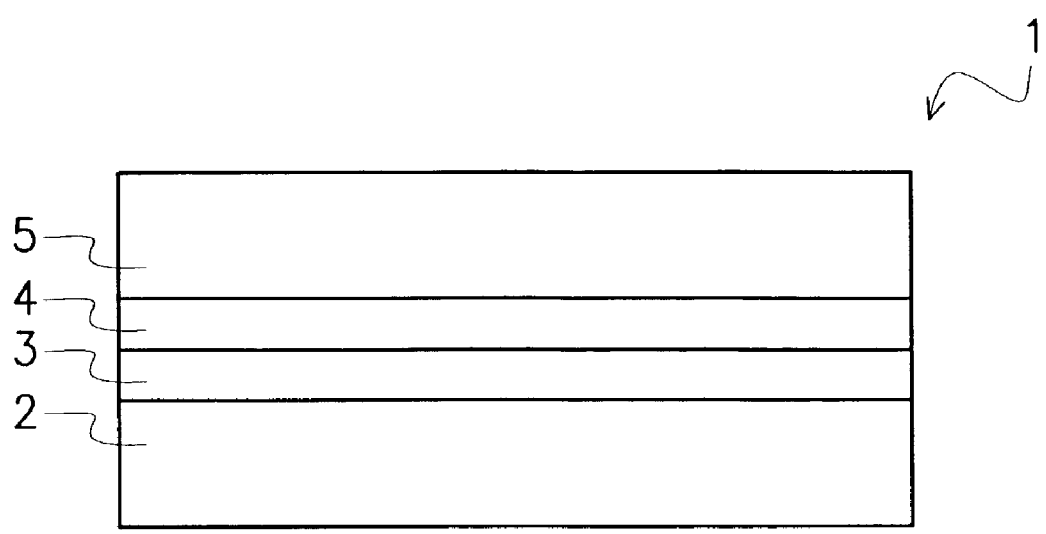
FIG. 1 is a schematic cross-sectional view illustrating the optical recording medium according to the present invention.

Referring to FIG. 1, the optical recording medium 1 is composted of a substrate 2, a dye layer 3 on the substrate 2, a reflection layer 4 and a protective layer 5 on the reflection layer 4.

The substrate 2 is made of, for example, polycarbonate (PC), polymethacrylate resin, polymethylmethacrylate resin, polyvinylchloride resin, polyimide resin or epoxy resin by mold injection. The substrate 2 has a thickness of about 0.6 mm.

The dye layer 3 is formed on the molded substrate by spin-coating. The dye layer 3 includes a cyanine type dye and a compound, wherein the compound is dissolved in tetrafluoropropanol having a solubility no more than 2% and the cyanine type dye is dissolve in tetrafluoropropanol having a solubility no less than 2%. Preferably, the compound in the dye layer 3 is contained in an amount of no less than 51% by weight based on the total amount of the dry component of the dye layer. Furthermore, etch of the compound and cyanine type dye has a maximum absorption at the wavelength range from 500 nm to 650 nm. The compound is an azo metal chelate compound selected from the formula (I):

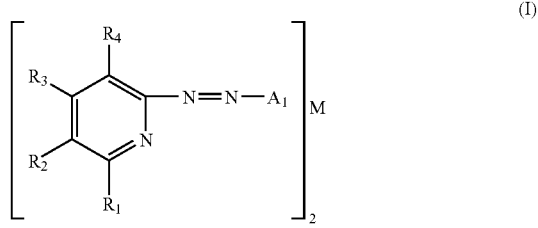

(I)

wherein M is a metal ion; $R_1$ is a hydrogen atom, a linear or branched alkyl group containing 1 to 6 carbon atoms, amino group, alkyl amino group or toluidinyl group; $R_2$ is a hydrogen atom, a hydroxyl group, a halogen atom, an ether group, an ester group or a linear or branched alkyl group containing 1 to 6 carbon atoms; $R_3$ is a hydrogen atom or a linear or branched alkyl group containing 1 to 6 carbon atoms; $R_4$ is a hydrogen atom, a halogen atom or a linear or branched alkyl group containing 1 to 6 carbon atoms; and A1 is a heterocyclic derivative group constituted by carbon atoms and nitrogen atoms.

In the above formula (I), $A_1$ is selected from the compound A-1 to A-21:

A-1
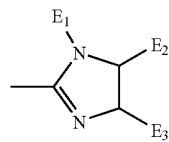

A-2
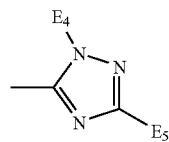

A-3
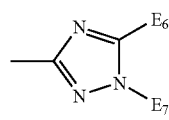

A-4
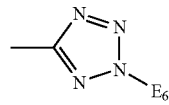

A-5
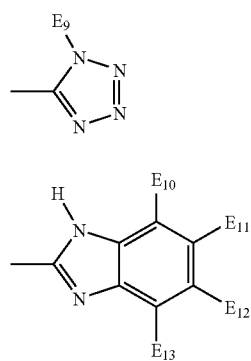

A-6
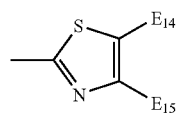

A-7
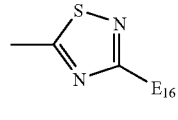

A-8
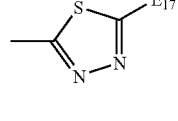

A-9
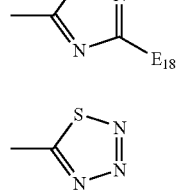

A-10

A-11

-continued

A-12
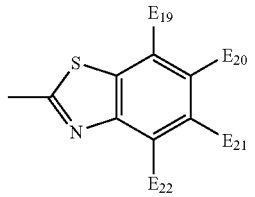

A-13
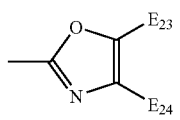

A-14
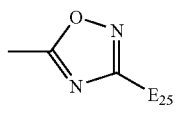

A-15
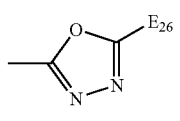

A-16

A-17

A-18
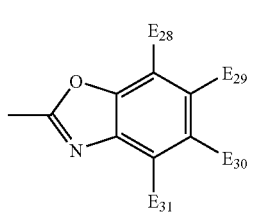

A-19
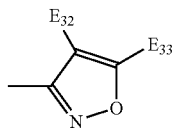

A-20
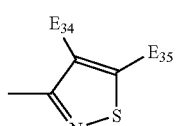

A-21
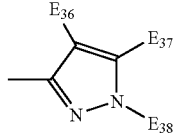

wherein each $E_1$ to $E_{38}$ is selected from a group consisting of a hydrogen atom, a halogen atom, a nitro group, a cyano group, an amino group, a formyl group, a hydroxyl group, a carboxyl group, an alkylamino group, a substituted or unsubstituted linear, branched or cyclic alkyl group containing 1 to 15 carbon atoms, a alkoxyl group, an alkoxycarbonyl group, a linear, branched or cyclic alkenyl group, a hydroxylalkyl group, an alkyoxycarboxyl group, an alkyoxycarbonylallyl group, alkylthio group, an alkylsulfonyl group, an aryl group, an alkyl hetrocyclic group. M is selected from a group consisting of Ni, Co, Cu, Fe, Pt, Ru, Rh, Pd, Ir and Zn.

The cyanine type dye has the following formula (II):

$$A^-Q_2^+\text{-HC}=\text{CH}-\text{CH}=Q \quad (II)$$

wherein each of $Q_1$ and $Q_2$ is a cyclic hydrocarbon group containing at least one nitrogen atom, while $A^-$ is $SbF_6^-$, $PF_6^-$, $BF_4^-$, $ClO_4^-$, $CF_3SO_2^-$, $C_2F_5SO_3^-$, $I^-$, $CF_3COO^-$ or $CH_3C_6H_4SO_3^-$.

Preferably, $Q_1$ has the following structure formula (II $Q_1$), while $Q_2$ has the following structure formula (II $Q_2$),

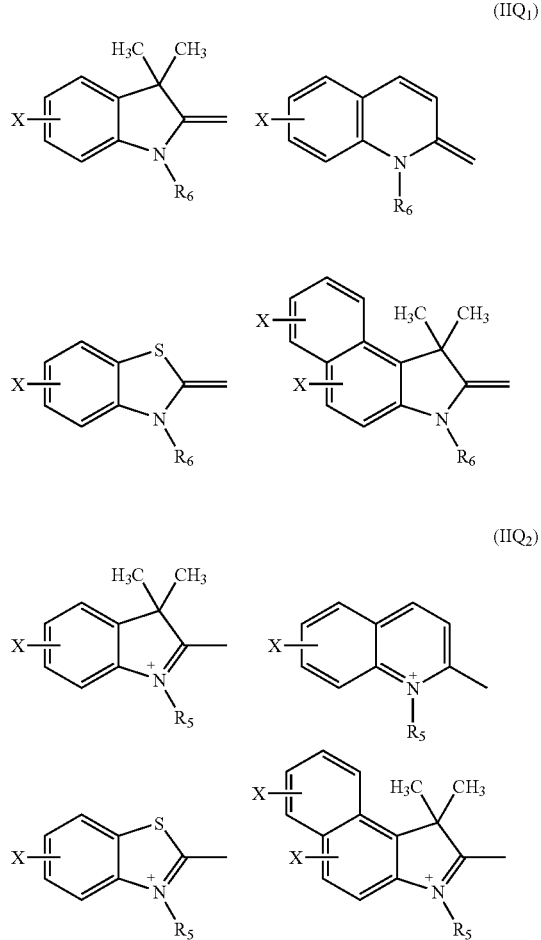

wherein each $R_5$ and $R_6$ is linear or branched alkyl group containing 1 to 12 carbon atoms, while X is selected from a group consisting of a hydrogen atom, a halogen atom, a nitro group, a cyano group, an amino group, an formyl group, a hydroxyl group, an alkylamino group, a substituted or unsubstituted linear, branched or cyclic alkyl group containing 1 to 5 carbon atoms, an alkoxyl group, a linear, branched or cyclic alkenyl group, a hydroxylalkyl group, an alkylthio group, alkylsulfonyl group, an aryl group, a hetrocyclic group.

The reflection layer 4 formed on the dye layer 3 is made of metal, for example, gold (Au), silver (Ag), aluminium (Al) or an alloy of them. The reflection layer 4 is formed by one of the vapor deposition methods such as sputtering or the vacuum evaporation and ion-plating method. Thereafter, the protective layer 5 is formed on the reflection layer 4. The protective layer 5 made of, for example, polycarbonate layer having a thickness of about 0.6 mm is bounded to the reflection layer 4.

EXAMPLE

Example 1

A molded resin substrate having a thickness of 0.6 mm is provided. The substrate has a spiral groove thereon. The pitch of the spiral groove is 0.74 μm and the depth of the spiral groove is 160 nm. An organic dye layer is formed by coating a solution including cyanine type dye on the molded resin substrate. The cyanine type dye is dissolved in tetrafluoropropanol so that the concentration of the solution is about 2 wt %. Thereafter, a silver layer formed by sputtering is formed on the organic dye layer and a protective layer having a thickness of 0.6 mm is bound to the silver layer. The PPb value of this optical recording medium is 0.119.

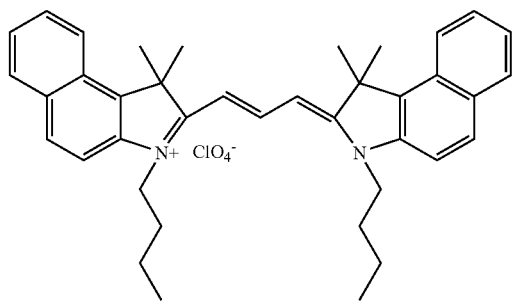

Example 2

The procedure for preparation of the optical recording medium in Example 1 is repeated except the cyanine type dye is replaced by the following cyanine type dye. The PPb value of this optical recording medium is 0.093.

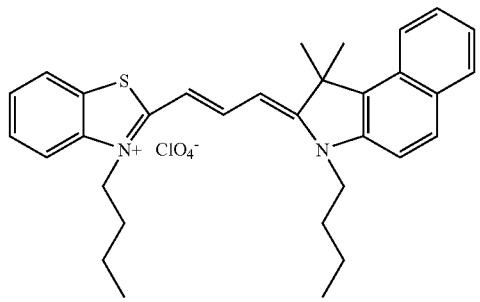

Example 3

The procedure for preparation of the optical recording medium in Example 1 is

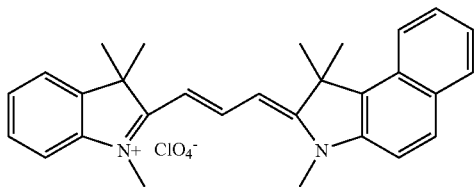

repeated except the cyanine type dye is replaced with following cyanine type dye. The PPb value of this optical recording medium is 0.105.

Example 4

The procedure for preparation of the optical recording medium in Example 1 is repeated except the cyanine type dye is replaced with the following azo metal chelate compound. The PPb value of this optical recording medium is 0.747.

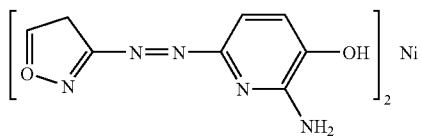

Example 5

The procedure for preparation of the optical recording medium in Example 1 is repeated except the organic dye layer is formed by coating a solution including the cyanine type dye in Example 1 and the azo metal chelate compound in Example 4 on the molded resin substrate. The weight ratio of the cyanine type dye to the azo metal chelate compound is 1:3. The PPb value of this optical recording medium is 0.387.

Example 6

The procedure for preparation of the optical recording medium in Example 5 is repeated except the weight ratio of the cyanine type dye to the azo metal chelate compound is 3:7. The PPb value of this optical recording medium is 0.416.

Example 7

The procedure for preparation of the optical recording medium in Example 5 is repeated except the weight ratio of the cyanine type dye to the azo metal chelate compound is 2:3. The PPb value of this optical recording medium is 0.328.

According to the above examples, the PPb values of Example 1, 2 and 3 only using the cyanine type dye as a dye layer is too low; while the PPb values of Example 4 only using the azo metal chelate compound as a dye layer is too high. Therefore, the optical recording medium formed by Example 1, 2, 3 and 4 are disadvantageous for tracking. However, the PPb values of Example 5, 6 and 7 using the cyanine type dye and the azo metal chelate compound as a dye layer meet the specification range of DVD-R (0.22~0.44).

On the other hand, if the optical recording medium formed by Example 5, 6 and 7 is placed in a lightfastness machine with a high pressure mercury vapor lamp, after 72 hours, the quality of optical recording medium optical does not degrade. The result exhibits that the optical recording medium of the present invention can improve the durability against optical degradation of the cyanine type dye.

Therefore, the optical recording medium of the present invention can be used as DVD-R and can improve the tracking signal, the storage stability and the durability against optical degradation.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. An optical recording medium, comprising:
   a substrate;
   a dye layer on the substrate; and
   a reflection layer on the dye layer,
   wherein the dye layer comprises a cyanine type dye and an azo metal chelate compound has the following formula (I):

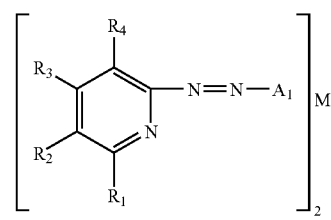

(I)

wherein M is a metal ion; $R_1$ is a hydrogen atom, a linear or branched alkyl group containing 1 to 6 carbon atoms, amino group, alkyl amino group or toluidinyl group; $R_2$ is a hydrogen atom, a halogen atom, an ether group, an ester group or a linear or branched alkyl group containing 1 to 6 carbon atoms; $R_3$ is a hydrogen atom or a linear or branched alkyl group containing 1 to 6 carbon atoms; $R_4$ is a hydrogen atom, a halogen atom or a linear or branched alkyl group containing 1 to 6 carbon atoms; and A1 is a heterocyclic derivative group constituted by carbon atoms and nitrogen atoms The optical recording medium according to claim 1, wherein $A_1$ is selected from a compound of A-1 to A-21:

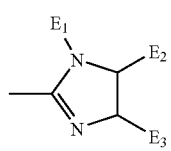

A-1

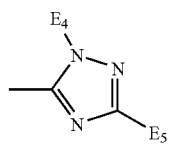

A-2

-continued

A-3 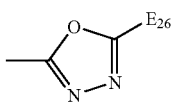  A-15

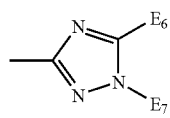

A-4 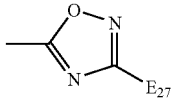  A-16

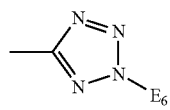

A-5 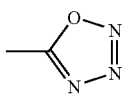  A-17

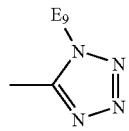

A-6 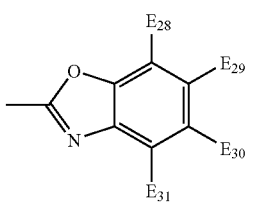  A-18

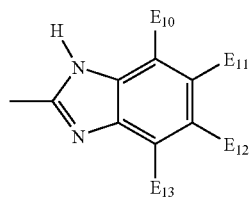

A-7 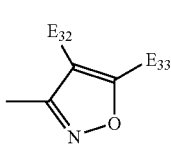  A-19

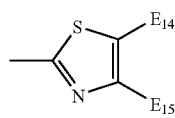

A-8 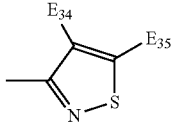  A-20

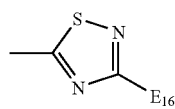

A-9 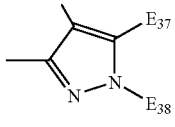  A-21

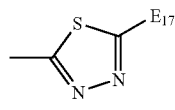

A-10

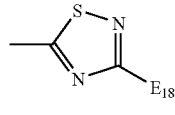

A-11

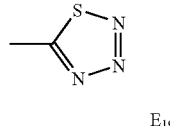

A-12

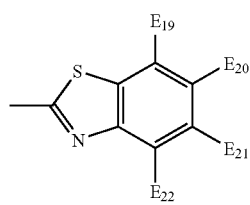

A-13

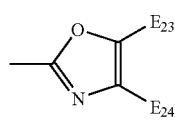

A-14

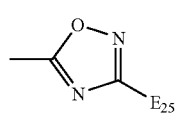

wherein each $E_1$ to $E_{38}$ is selected from a group consisting of a hydrogen atom, a halogen atom, a nitro group, a cyano group, an amino group, a formyl group, a hydroxyl group, an alkylamino group, a substituted or unsubstituted linear, branched or cyclic alkyl group containing 1 to 15 carbon atoms, a alkoxyl group, an alkyoxycarbonyl group, a linear, branched or cyclic alkenyl group, a hydroxylalkyl group, an alkyoxycarboxyl group, an alkyoxycarbonylallyl group, alkylthio group, an alkylsulfonyl group, an aryl group, an alkyl hetrocyclic group.

2. The optical recording medium according to claim 1, wherein the cyanine type dye has the following formula (II):

$$A^- Q_2^+ \text{-HC--CH=CH=}Q_1 \quad (II)$$

wherein $A^-$ is $SbF_6^-$, $PF_6^-$, $BF_4^-$, $ClO_4^-$, $CF_3SO_2^-$, $C_2F_5SO_3^-$, $I^-$, $CF_3COO^-$ or $CH_3C_6H_4SO_3^-$; $Q_1$ has the following formula (II $Q_1$); and $Q_2$ has the following formula (II $Q_2$):

wherein each $R_5$ and $R_6$ is a linear or branched alkyl group containing 1 to 12 carbon

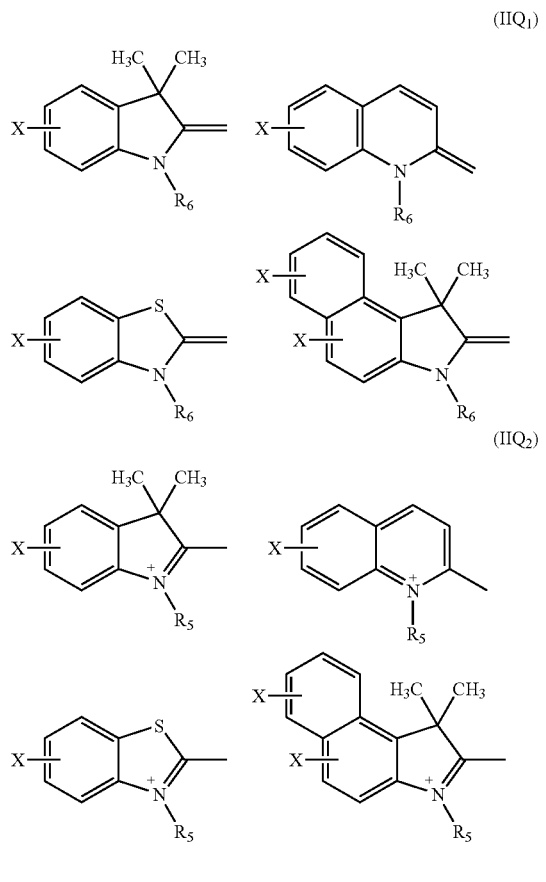

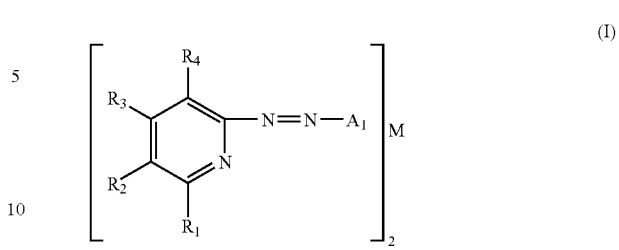

wherein M is a metal ion; $R_1$ is a hydrogen atom, a linear or branched alkyl group containing 1 to 6 carbon atoms, an amino group, alkyl amino group or toluidinyl group; $R_2$ is a hydrogen atom, a halogen atom, an ether group, an ester group or a linear or branched alkyl group containing 1 to 6 carbon atoms; $R_3$ is a hydrogen atom or a linear or branched alkyl group containing 1 to 6 carbon atoms; $R_4$ is a hydrogen atom, a halogen atom or a linear or branched alkyl group containing 1 to 6 carbon atoms; and A1 is a heterocyclic derivative group constituted of carbon atoms and nitrogen atoms, wherein $A_1$ is selected from a compound of A-1 to A-21:

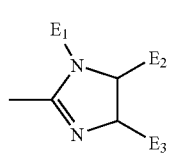

A-1

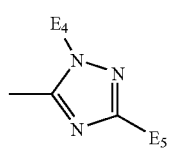

A-2

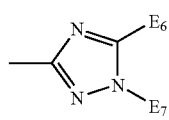

A-3

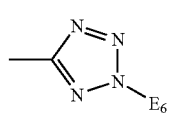

A-4

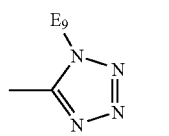

A-5

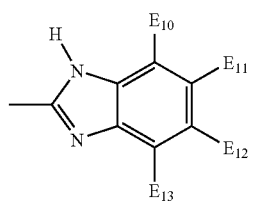

A-6 atoms; and X is selected from a group consisting of a hydrogen atom, a halogen atom, a nitro group, a cyano group, an amino group, an formyl group, a hydroxyl group, an alkylamino group, a substituted or unsubstituted linear, branched or cyclic alkyl group containing 1 to 5 carbon atoms, an alkoxyl group, a linear, branched or cyclic alkenyl group, a hydroxylalkyl group, an alkylthio group, alkylsulfonyl group, an aryl group and a hetrocyclic group.

3. The optical recording medium according to claim 1 further comprises a protective layer on the reflection layer.

4. The optical recording medium according to claim 1, wherein the optical recording medium is a digital versatile disc-recordable.

5. An optical recording medium according to claim 1, wherein each of the azo metal chelate compound and cyanine type dye has a maximum absorption at the wavelength range from 500 nm to 650 nm.

6. The optical recording medium according to claim 1, wherein the reflection layer is selected from a group consisting Au, Ag, Al or alloy of them.

7. An method for fabricating an optical recording medium, comprising:
providing a molded substrate;
spin-coating a dye layer on the molded substrate; and
depositing a reflection layer having enough reflection,
wherein the dye layer comprises a cyanine type dye and an azo metal chelate compound has the following formula (I):

-continued

A-7 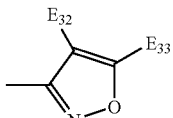

A-8 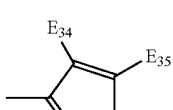

A-9 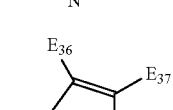

A-10

A-11

A-12

A-13

A-14

A-15

A-16

A-17

A-18

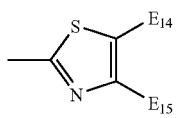 E-14

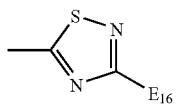 E-15, E-16

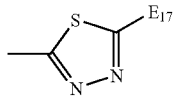 E-17

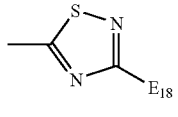 E-18

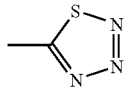

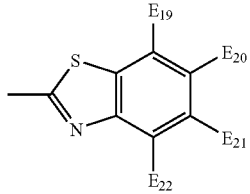 E-19, E-20, E-21, E-22

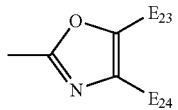 E-23, E-24

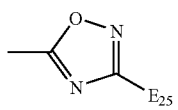 E-25

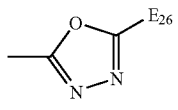 E-26

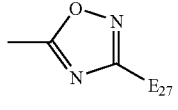 E-27

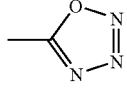

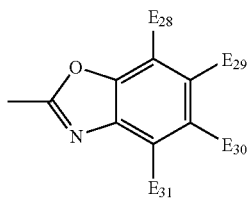 E-28, E-29, E-30, E-31

A-19

A-20

A-21 wherein each $E_1$ to $E_{38}$ is selected from a group consisting of a hydrogen atom, a halogen atom, a nitro group, a cyano group, an amino group, a formyl group, a hydroxyl group, a carboxyl group, an alkylamino group, a substituted or unsubstituted linear, branched or cyclic alkyl group containing 1 to 15 carbon atoms, a alkoxyl group, an alkycarboxyl group, a linear, branched or cyclic alkenyl group, a hydroxylalkyl group, an alkyoxycarboxyl group, an alkyoxycarbonylallyl group, alkylthio group, an alkylsulfonyl group, an formyl group and an alkyl hetrocyclic group.

8. The method for fabricating an optical recording medium according to claim 7, wherein M is selected from a group consisting of Ni, Co, Zn or Cu.

9. The method for fabricating an optical recording medium according to claim 7, wherein the cyanine type dye has the following formula (II):

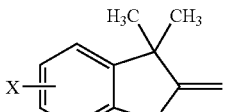 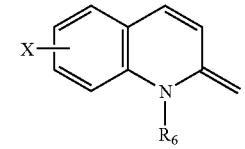

(IIQ₁)

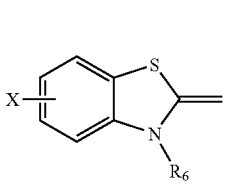 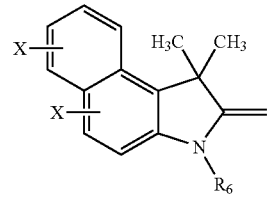

(IIQ₂)

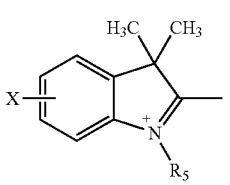 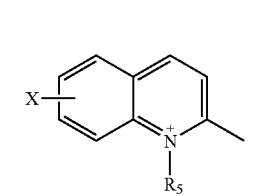

-continued

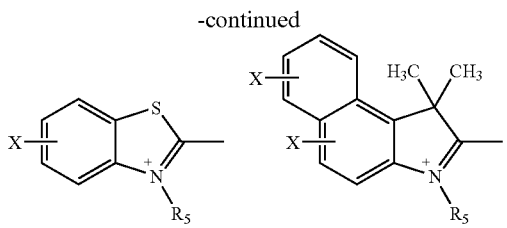

wherein $A^-$ is $SbF_6^-$, $PF_6^-$, $BF_4^-$, $ClO_4^-$, $CF_3SO_2^-$, $C_2F_5SO_3^-$, $I^-$, $CF_3COO^-$ or $CH_3C_6H_4SO3^-$; $Q_1$ has the following formula (II $Q_1$); and $Q_2$ has the following formula (II $Q_2$):

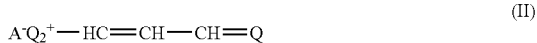
(II)

wherein each $R_5$ and $R_6$ is linear or branched alkyl group; and X is selected from a group consisting of a hydrogen atom, a halogen atom, a nitro group, a cyano group, an amino group, a formyl group, a hydroxyl group, an alkylamino group, a substituted or unsubstituted linear, branched or cyclic alkyl group containing 1 to 5 carbon atoms, an alkoxyl group, a linear, branched or cyclic alkenyl group, a hydroxylalkyl group, an alkylthio group, alkylsulfonyl group, an aryl group and a hetrocyclic group.

10. The method for fabricating an optical recording medium according to claim 7, wherein the optical recording medium is a digital versatile disc-recordable.

11. The method for fabricating an optical recording medium according to claim 7, further comprises bonding a protective layer on the reflection layer.

12. The method for fabricating an optical recording medium according to claim 7, wherein the cyanine type dye and the azo metal chelate compound are dissolved in alcohol.

13. The method for fabricating an optical recording medium according to claim 7, wherein the cyanine type dye and the azo metal chelate compound are dissolved in tetrafluoropropanol.

14. The method for fabricating an optical recording medium according to claim 7, wherein the azo metal chelate compound is no less than 51% by weight based on the total amount of the dye layer.

15. The method for fabricating an optical recording medium according to claim 7, each of the azo metal chelate compound and cyanine type dye has a maximum absorption at the wavelength range from 500 nm to 650 nm.

16. The method for fabricating an optical recording medium according to claim 7, wherein the reflection layer is selected from a group consisting Au, Ag, Al or alloy of them.

17. A method for improving tracking signal of an optical recording medium, wherein the optical recording medium includes a dye layer, the method comprising:
using at least one compound and at least one cyanine type dye in tetrafluoropropanol to form the dye layer, wherein the compound is contained in amount of no less than 51% by weight of the total amount of the dye layer,
wherein the compound is an azo metal chelate compound has the following formula (I):

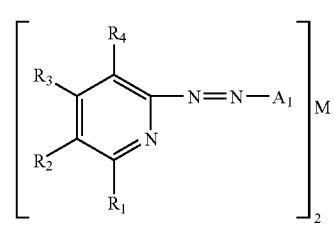
(I)

wherein M is a metal ion; $R_1$ is a hydrogen atom, a linear or branched alkyl group containing 1 to 6 carbon atoms, amino group, alkyl amino group or toluido group; $R_2$ is a hydrogen atom, a halogen atom, an ether group, an ester group or a linear or branched alkyl group containing 1 to 6 carbon atoms; $R_3$ is a hydrogen atom or a linear or branched alkyl group containing 1 to 6 carbon atoms; $R_4$ is a hydrogen atom, a halogen atom or a linear or branched alkyl group containing 1 to 6 carbon atoms; and A1 is a heterocyclic derivative group constituted of carbon atoms and nitrogen atoms, and wherein $A_1$ is selected from a compound of A-1 to A-21:

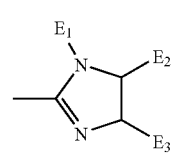
A-1

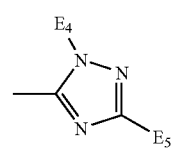
A-2

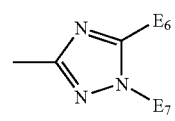
A-3

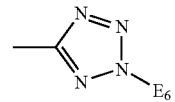
A-4

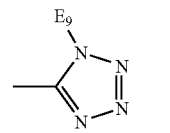
A-5

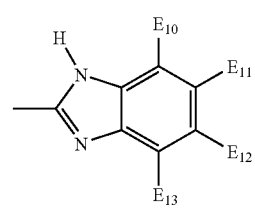
A-6

A-7 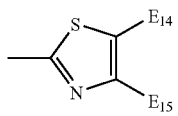

A-8 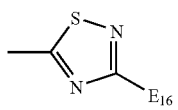

A-9 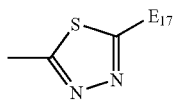

A-10 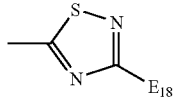

A-11 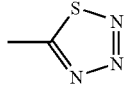

A-12 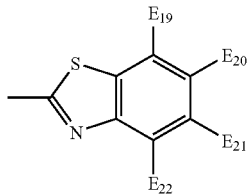

A-13 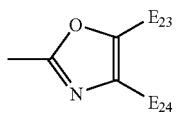

A-14 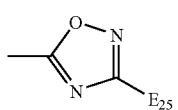

A-15 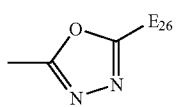

A-16 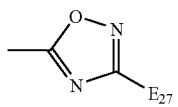

A-17 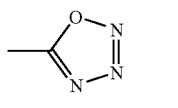

A-18 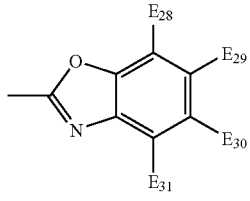

A-19

A-20

A-21

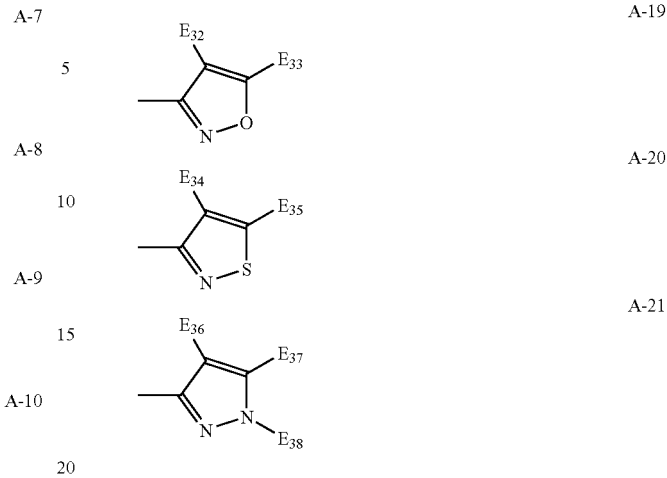

wherein each $E_1$ to $E_{38}$ is selected from a group consisting of a hydrogen atom, a halogen atom, a nitro group, a cyano group, an amino group, a formyl group, a hydroxyl group, a carboxyl group, an alkylamino group, a substituted or unsubstituted linear, branched or cyclic alkyl group containing 1 to 15 carbon atoms, a alkoxyl group, an alkylcarbonyl group, a linear, branched or cyclic alkenyl group, a hydroxylalkyl group, an alkyoxycarbonyl group, an alkyoxycarbonylallyl group, alkylthio group, an alkylsulfonyl group, an formyl group and an alkyl hetrocyclic group.

18. The method for improving tracking signal of an optical recording medium according to claim 17, wherein M is selected from a group consisting of Ni, Co, Zn or Cu.

19. The method for improving tracking signal of an optical recording medium according to claim 17, wherein the optical recording medium is a digital versatile disc-recordable.

20. The method for improving tracking signal of an optical recording medium according to claim 17, wherein each of the compound and cyanine type dye has a maximum absorption at the wavelength range from 500 nm to 650 nm.

21. An optical recording medium comprising at least one compound and at least one cyanine type dye, wherein the compound is contained in amount of no less than 51% by weight of the total amount of the dye layer, wherein the compound is an azo metal chelate compound has the following formula (I):

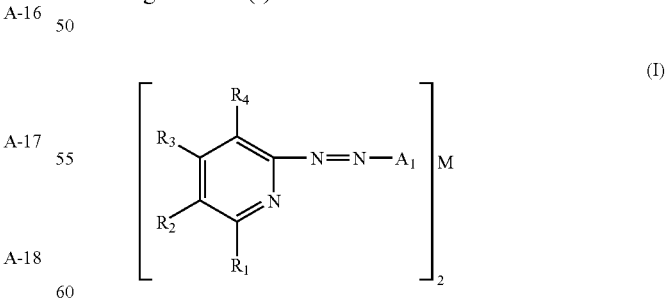

wherein M is a metal ion; $R_1$ is a hydrogen atom, a linear or branched alkyl group containing 1 to 6 carbon atoms, amino group, alkyl amino group or toluido group; $R_2$ is a hydrogen atom, a halogen atom, an ether group, an ester group or a linear or branched alkyl group containing 1 to 6 carbon atoms; $R_3$ is a hydrogen atom or a linear or branched alkyl group containing 1 to 6 carbon atoms; $R_4$ is a hydrogen atom, a halogen atom or a linear or branched alkyl group containing 1 to 6 carbon atoms; and A1 is a heterocyclic derivative group constituted of carbon atoms and nitrogen atoms, and wherein $A_1$ is selected from a compound of A-1 to A-21:

A-1
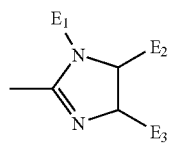

A-2
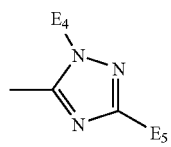

A-3
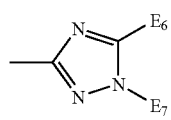

A-4
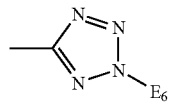

A-5
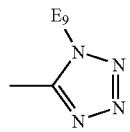

A-6
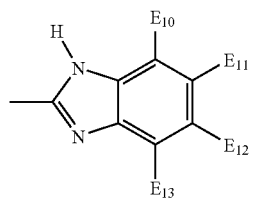

A-7
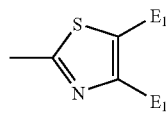

A-8
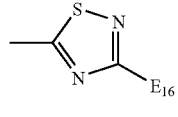

A-9
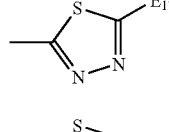

A-10
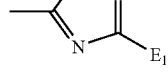

-continued

A-11
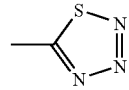

A-12
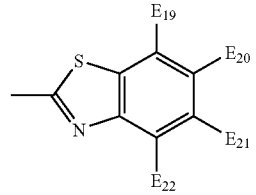

A-13
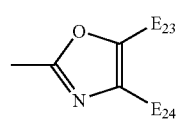

A-14
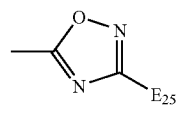

A-15
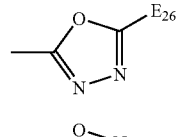

A-16
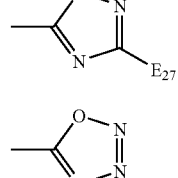

A-17

A-18
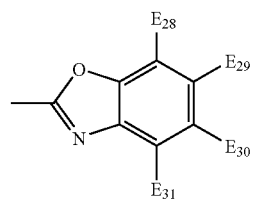

A-19
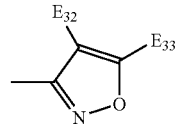

A-20

A-21 wherein each $E_1$ to $E_{38}$ is selected from a group consisting of a hydrogen atom, a halogen atom, a nitro group, a cyano group, an amino group, a formyl group, a hydroxyl group, a carboxyl group, an alkylamino group, a substituted or unsubstituted linear, branched or cyclic alkyl group containing 1 to 15 carbon atoms, a alkoxyl group, an alkylcarbonyl group, a linear, branched or cyclic alkenyl group, a hydroxylalkyl group, an alkyoxycarbonyl group, an alkyoxycarbonylallyl group, alkylthio group, an alkylsulfonyl group, an formyl group and an alkyl hetrocyclic group.

* * * * *